3,040,057
Patented June 19, 1962

3,040,057
PROCESS FOR PREPARING 1,2-DITHIOLE-3-THIONES FROM AROMATIC ORTHO-METHYL THIOLS
Lyle A. Hamilton, Pitman, and Phillip S. Landis, Woodbury, N.J., assignors to Socony Mobil Oil Company, Inc., a corporation of New York
No Drawing. Filed Aug. 25, 1959, Ser. No. 835,843
4 Claims. (Cl. 260—327)

The invention relates to the preparation of 1,2-dithiole-3-thiones.

The object of the invention is to provide a novel method for the preparation of a particular class of 1,2-dithiole-3-thiones, viz., those in which the Nos. 4 and 5 carbon atoms of the 1,2-dithiole-3-thione ring also form part of a benzene ring therein. The compounds prepared by the invention are, therefore, characterized by the presence therein of the following structure:

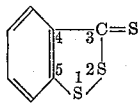

In accordance with the invention, it has been found that when a compound, having methyl and thiol groups attached to an aromatic ring therein in ortho relationship to one another is reacted with sulfur at temperatures of from about 180° C. to about 250° C., the methyl and thiol groups are dehydrogenated and a 1,2-dithiole-3-thione ring formed.

The reaction is represented by the following general equation:

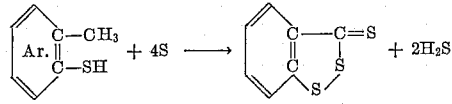

The aromatic ring (Ar.) which carries the ortho-methyl and thiol groups in the starting ortho-methyl thiol (and which forms part of the 1,2-dithiole-3-thione ring in the 1,2-dithiole-3-thione product) may contain other substituent groups or it may be part of a condensed ring system which in turn may contain other ring substituents.

It has been found, however, that certain ortho-methyl thiols, such as those having aliphatic substituents of more than about 4 carbon atoms, are not useful in the invention since these aliphatic groups are quite reactive with sulfur under the conditions of reaction forming tarry by-products which reduce the yield of thione product to unpracticable levels and make separation and recovery of the thione product extremely difficult.

Accordingly, the aromatic ortho-methyl thiols to which the reaction is applicable are those having at least one methyl group in ortho relationship to at least one thiol group and in which the aromatic ring substituents thereof, other than said methyl and thiol groups, are selected from hydrogen, alkyl groups of from 1 to about 4 carbon atoms and phenyl groups.

The following are mentioned as non-limiting examples of the aromatic o-methyl thiols contemplated for use in the invention:

4-methyl-2-thiocresol
3,4-di-methyl-2-thiocresol
3,4,5-tri-methyl-2-thiocresol
3-phenyl-2-thiocresol
2,4-dimethyl-1,5-benzene dithiol
3-phenyl-4-methyl-2-thiocresol
3-tertiary butyl-2-thiocresol
3,4,5,6-tetra-methyl-2-thiocresol
3,4,5,6-tetra-phenyl-2-thiocresol
2-methyl-naphthalene-1-thiol
2-methyl-6-t-butyl-naphthalene-1-thiol
1-methyl-phenanthrene-2-thiol
1-methyl-6,8-di-ethyl-phenanthrene-2-thiol
1-methyl-pentacene-2-thiol The reaction is conducted simply by mixing the aromatic, ortho-methyl thiol compound and the sulfur together and heating the mixture to a temperature of from about 180° C. to about 250° C., until evolution of hydrogen sulfide substantially ceases, which indicates completion of the reaction. This usually requires at least about 1 hour and generally from about 1 to about 6 hours, depending upon the particular ortho-methyl thiol compound used in the reaction.

The reaction utilizes 4 mols of sulfur per mol of the aromatic ortho-methyl thiol compound. However, it is generally preferred to use an excess of sulfur, say, 4½ to 5 mols thereof for each mol of the aromatic ortho-methyl thiol compound in order to insure good conversion of the latter to the 1,2-dithiole-3-thione product.

When the reaction is complete, the 1,2-dithiole-3-thione product is conveniently recovered by distillation of the product mixture. However, other known recovery techniques, such as solvent-extraction and recrystallization may be used.

A typical reaction, in accordance with the invention, is that between ortho-thiocresol and sulfur to form 4,5-benzo-1,2-dithiole-3-thione. This reaction is described in the following illustrative example.

EXAMPLE

*4,5-Benzo-1,2-Dithiole-3-Thione*

Sixty-five grams of ortho-thiocresol (0.5 mol) and 80 grams of sulfur (2.4 mols) were heated at 180° C. to 200° C. for 3½ hours. The product was vacuum-distilled and 80 grams were collected boiling in the range of 170° C. to 220° C., at 1 to 2 mm. pressure. This product crystallized on standing. The crystals were washed with ether and had a melting point of 96° C. to 98° C. and contained 53.0% sulfur. 4,5-benzo-1,2-dithiole-3-thione is reported to have a melting point of 98° C. and has a theoretical sulfur content of 52.2%.

The aromatic 1,2-dithiole-3-thiones produceable by the process of the invention are useful as extreme pressure additives for mineral lubricating oils. See Patent No. 2,653,910. They are also highly effective detergents for use in solutions or films designed to filter out ultra-violet and blue light. This property of filtering out ultra-violet light makes them particularly useful in rubber and plastics as stabilizers to prevent deterioration caused by exposure to light.

Although the invention has been described herein by means of specific illustrative examples and embodiments, it is not intended that the scope thereof be limited in any way thereby, except as indicated in the following claims.

We claim:

1. A process for preparing a 1,2-dithiole-3-thione compound which comprises reacting an ortho-methyl benzene thiol compound in which the benzene ring substituents thereof other than methyl and thiol are selected from the group consisting of hydrogen, alkyl of from 1 to about 4 carbon atoms and phenyl, with sulfur, at a temperature of from about 180° C. to about 250° C. and for a sufficient time to effect reaction.

2. A process for preparing 4,5-benzo-1,2-dithiole-3-thione which comprises reacting ortho-thiocresol with sulfur at a temperature of from about 180° C. to about 250° C. and for a sufficient time to effect reaction.

3. A process for preparing 4,5-benzo-bis-1,2-dithiole-3-thione which comprises reacting 2,4-dimethyl-1,5-benzene dithiol with sulfur, at a temperature of from about 180° C. to about 250° C. and for a sufficient time to effect reaction.

4. A process for preparing 4,5-naphtho-1,2-dithiole-3-thione which comprises reacting 1-methyl-naphthalene-2-thiol with sulfur, at a temperature of from about 180° C. to about 250° C. and for a sufficient time to effect reaction.

References Cited in the file of this patent

FOREIGN PATENTS 1,052,014    France  ------------------  Sept. 23, 1953

OTHER REFERENCES

Luttringhaus et al.: Liebig's Annalen, vol. 560, pages 201–14 (1947).